(12) United States Patent
Gardner, Jr et al.

(10) Patent No.: US 6,255,645 B1
(45) Date of Patent: Jul. 3, 2001

(54) METHOD AND APPARATUS FOR OPTICALLY MEASURING DRIVE TRAIN BACKLASH

(75) Inventors: Richard L Gardner, Jr, Greeley; Robert L Mueller, Windsor; Richard A Irwin, Fort Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/326,790

(22) Filed: Jun. 4, 1999

(51) Int. Cl.[7] .............................. G01D 5/26; F16H 55/18
(52) U.S. Cl. .............................. 250/231.13; 250/231.15; 74/409
(58) Field of Search .................... 250/231.13, 231.14, 250/231.15, 231.18, 216, 208.1; 74/409, 440

(56) References Cited

U.S. PATENT DOCUMENTS 5,819,588 * 10/1998 Deane et al. ........................... 74/409
6,194,697 * 2/2001 Gardner, Jr. ....................... 250/208.1

* cited by examiner

Primary Examiner—John R. Lee
Assistant Examiner—Kevin Pyo

(57) ABSTRACT

Methods and apparatus for quantifying the amount of backlash in drive trains. Using two optical transducers techniques are disclosed that lend themselves to self diagnosis of backlash in drive train systems. The techniques are useful in autochanger drive systems, but are also applicable to all systems involving the driven motion of devices.

12 Claims, 2 Drawing Sheets

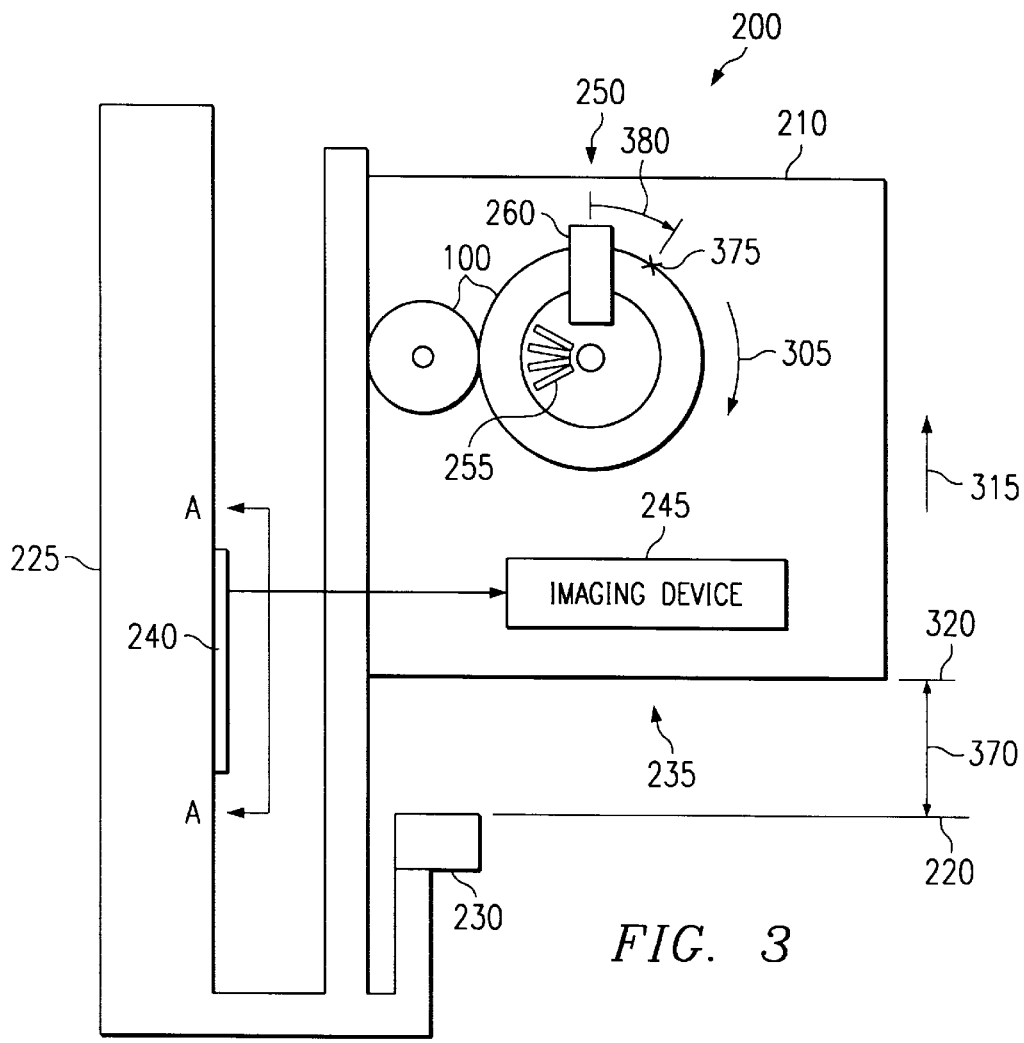
FIG. 3
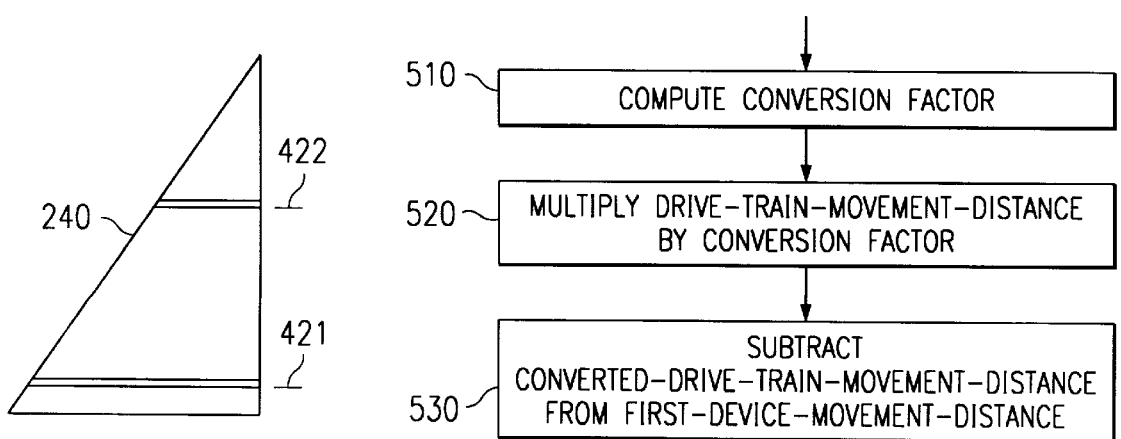
FIG. 4
FIG. 5

METHOD AND APPARATUS FOR OPTICALLY MEASURING DRIVE TRAIN BACKLASH

FIELD OF THE INVENTION

The present invention relates generally to measurement of backlash in systems of gears in drive trains and, more particularly, to the optical measurement of backlash in systems of gears in drive trains.

BACKGROUND OF THE INVENTION

The precise positioning of one mechanism with respect to a reference device is often accomplished by utilizing a system of gears. Power, often supplied by an electric motor, is transferred via the gears to move the mechanism. Precise positioning is dependent upon so called backlash or the looseness in the coupling between the gears. The greater the backlash, the less precise is the positioning of the mechanism with respect to the reference device. Some backlash is inevitable as it is impossible to manufacture gears that exactly mate with one another.

Backlash can be measured in gear systems by blocking movement of the driven gear and measuring the movement of the drive gear between its resulting limits of motion. This method is, however, time consuming, labor intensive, and not conducive to mass production of identical systems. Often backlash is measured in a representative number of systems and the average of these measurements is used as the backlash for all similar systems. This nominal backlash is then used as an offset in the control system. This method suffers from several disadvantages. In particular, unit-to-unit variations in backlash are not accounted for, and backlash changes over time are not accounted for.

SUMMARY OF THE INVENTION

In representative embodiments, the present invention discloses methods and apparatus for quantifying the amount of backlash present in drive trains. The techniques discussed lend themselves to self diagnosis of these systems. Optical methods are used. Such technique are useful in autochanger drive systems, but are applicable to all systems involving the driven motion of devices.

Typically during the life of driven motion devices the magnitude of the backlash increases due to the wear inherent in mechanical systems. The backlash problem is found in gear train systems, as well as other forms of driven motion devices. The invention is not limited to gear trains, but is applicable to all forms of driven motion devices. The driven system could be, but not limited to, Digital Linear Tape systems.

A movable device is positioned in front of an optical target, and the drive train is biased in one direction. The imaging system then looks at a target located on a fixed frame and measures its location. The drive train is then reversed and the angle of rotation measured as the number of counts on an encoder disk is counted by a second optical system. The target located on the fixed frame is used to determine the actual movement of the moveable device.

A primary advantage of the embodiments as described in the present patent document over prior methods lies in the fact that these methods lend themselves to self diagnosis, since measurement of the backlash in a robotic system can be performed periodically throughout the life of the drive train. If the degree of the backlash reaches a predefined limit, the robotic system can inform the user that the drive train is wearing out.

A further advantage is that these methods also lend themselves to adaptive control. The robotic system can accurately compensate for changes in backlash with time. This ability allows for accurate positioning throughout the life of the drive train.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and:

FIG. 3 is another drawing of the robotic system of FIG. 2 as described in various representative embodiments of the present patent document.

FIG. 4 is drawing of the first target as viewed from section A—A of FIGS. 2 and 3 as described in various representative embodiments of the present patent document.

FIG. 5 is a flow chart of the method steps performed in computing the backlash from measured values as described in various representative embodiments of the present patent document.

DETAILED DESCRIPTION OF THE PREFERRED EMBODIMENTS

1. Introduction

Figure 1:
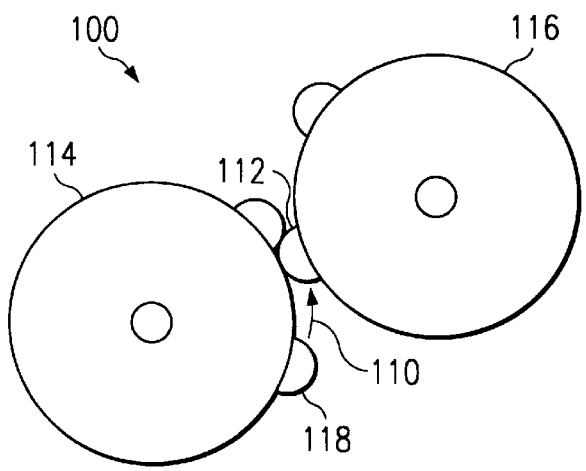
FIG. 1 is a drawing of a drive train with backlash as described in various representative embodiments of the present patent document.

As shown in the drawings for purposes of illustration, the present patent document relates to a novel method and apparatus for quantifying the amount of backlash present in drive trains. In representative embodiments, the present document discloses techniques lending itself to self diagnosis of the drive train systems. Optical methods are used. The technique are useful in autochanger drive systems, but are applicable to all systems involving the driven motion of devices. In the following detailed description and in the several figures of the drawings, like elements are identified with like reference numerals.

2. Discussion

FIG. 1 is a drawing of a drive train 100 with backlash 110 as described in various representative embodiments of the present patent document. FIG. 1 demonstrates the backlash problem inherent in driven motion devices. This backlash problem in FIG. 1 results from the fact that a first gear-tooth 112 on a first gear 114 must travel the distance 114, also referred to herein as backlash 110 and the backlash distance 110, before motion is imparted by the first gear 114 to a second gear 116. This motion is imparted by means of contact between the first-gear tooth 112 and the second gear-tooth 118. Typically during the life of driven motion devices the amount of backlash 110 increases due to the wear inherent in mechanical systems. Gear train systems are used in FIG. 1 and subsequent drawings for illustrative purposes only. The backlash problem is inherent in other forms of driven motion devices. The invention is not limited to gear trains. It is applicable to all forms of driven motion devices.

Figure 2:
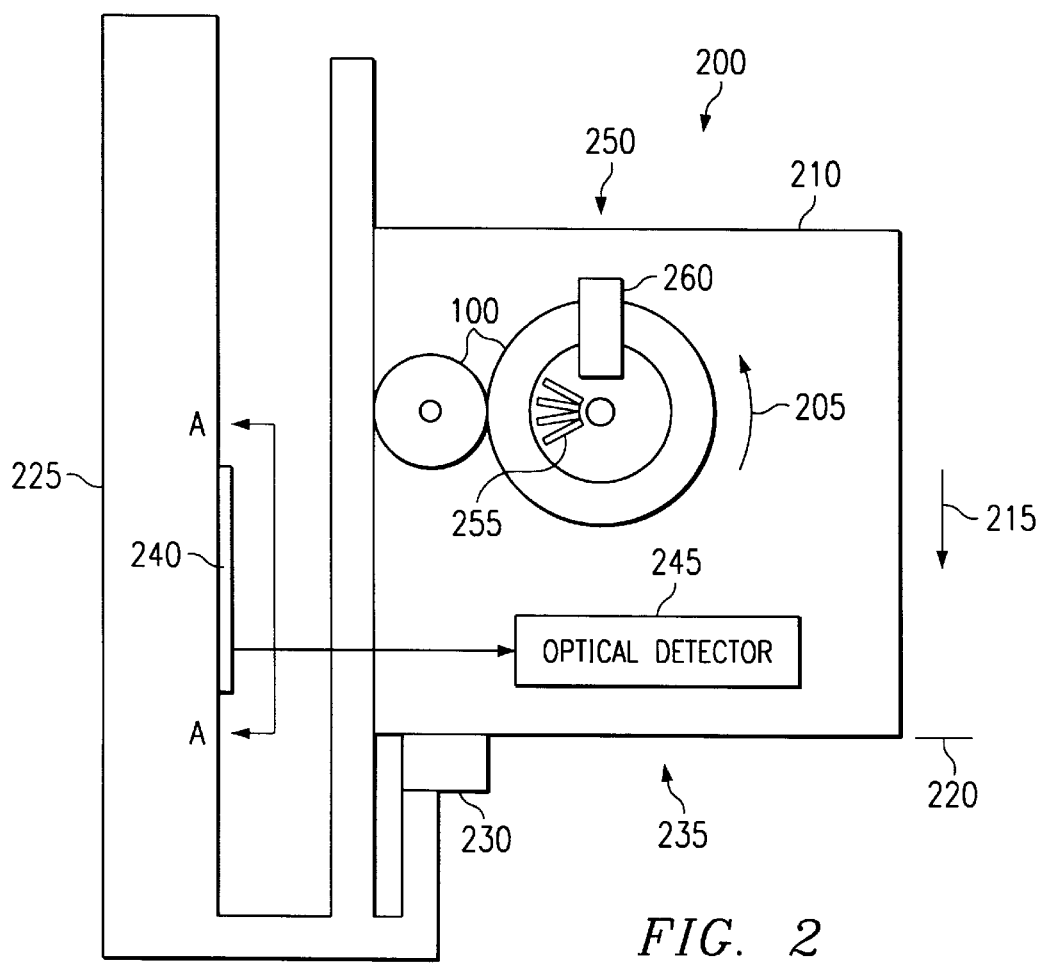
FIG. 2 is a drawing of a robotic system as described in various representative embodiments of the present patent document.

FIG. 2 is a drawing of a robotic system 200 as described in various representative embodiments of the present patent document. As an example, the robotic system 200 could be used in, but not limited to, Digital Linear Tape systems. In the representative example of FIG. 2, a first force 205 is applied to the drive train 100 until a first device 210 moves in a first direction 215 to a first position 220, wherein the drive train 100 is attached to the first device 210 and is moveably attached to a second device 225 and wherein a restraining member 230 is attached to the second device 225 and prevents movement of the first device 210 from the first position 220 in the first direction 215.

Also shown in FIG. 2 is a first motion transducer 235, wherein the first motion transducer 235 comprises a first target 240 attached to the second device 225 and a first optical detector 245 attached to the first device 210. The first optical detector 245 detects an image from the first target 240 and uses that image to identify the position of the first device 210 relative to the second device 225 which in FIG. 2 is the first position 220. A more complete discussion of the first target 240 will be provided later in this document.

In addition, FIG. 2 shows a second motion transducer 250 comprising a second target 255 and a second optical detector 260. The second target 255 in the preferred embodiment comprises a pattern of optically reflecting stripes on a gear providing motion to the first device 210. The second motion transducer 250 measures the distance that the drive train 100 moves by counting the optically reflecting stripes passing under the second optical detector 260.

FIG. 3 is another drawing of the robotic system 200 of FIG. 2 as described in various representative embodiments of the present patent document. FIG. 3 shows the first device 210 in a second position 320. In the representative example of FIG. 3, a second force 305 is applied to the drive train 100 until the first device 210 moves in a second direction 315 to the second position 320. A first device movement distance 370 is the distance between the first position 220 and the second position 320 and is the distance moved by the first device 210 between these two positions. A drive-train-representative-point 375 located under the second optical detector 260 when the first device 210 is in the first position 220 moves a drive-train-movement-distance 380 to the position shown in FIG. 3 when the first device 210 is in the second position 320. The drive-train-movement-distance 380 could be either correspond to a measure of a linear movement or to an angular movement as in FIG. 3.

FIG. 4 is drawing of the first target 240 as viewed from section A—A of FIGS. 2 and 3 as described in various representative embodiments of the present patent document. In this figure, the preferred embodiment of the first optical detector 245 is a linear array optical detector. In this configuration, the number of pixels in the first optical detector 245 receiving illumination from the first target 240 corresponds to the position of the first device 210 with respect to the second device 225. More pixels are illuminated when the first device 210 is at the first position 220 shown in FIG. 2 than when it is at the second position 255 shown in FIG. 3. First and second first-target-positions 421, 422 from which the first optical detector 245 receives illumination when the first device 210 is at the first and second positions 220, 320 are shown on the first target 240 in FIG. 4.

The first motion transducer 235 and the components thereof are disclosed, in part, in the following United States patent application: Ser. No. 09/290, 807 of Gardner et al. for CALIBRATION SYSTEM FOR AN IMAGING APPARATUS AND METHOD, filed on Apr. 13, 1999 which is hereby incorporated by reference for all that is disclosed therein.

FIG. 5 is a flow chart of the method steps performed in computing the backlash 110 from measured values as described in various representative embodiments of the present patent document. FIG. 5 is a flow chart of the method steps performed in computing the backlash 110.

In block 510 a conversion factor is computed, wherein the conversion factor is the ratio of the distance that the first device 210 would move in response to a unit length movement of the drive-train-representative-point 375 in the absence of any backlash 110. Block 510 then transfers control to block 520.

In block 520 The drive-train-movement-distance 380 is then multiplied by the conversion factor to obtain a converted-drive-train-movement-distance. Block 520 then transfers control to block 530.

In block 530 the converted-drive-train-movement-distance is subtracted from the first-device-movement-distance to obtain the backlash 110.

In the preferred embodiment of the method described in the present patent document, optical methods for quantifying the amount of backlash present in the drive train are used.

A primary advantage of the embodiments as described in the present patent document over prior methods lies in the fact that these methods lend themselves to self diagnosis, since measurement of the backlash in a robotic system can be performed periodically throughout the life of the drive train. If the degree of the backlash reaches a predefined limit, the robotic system can inform the user that the drive train is wearing out.

A further advantage is that these methods also lend themselves to adaptive control. The robotic system can accurately compensate for changes in backlash with time. This ability allows for accurate positioning throughout the life of the drive train.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A method for measuring backlash in a drive train, comprising:

applying a first force to the drive train until a first device moves in a first direction to a first position, wherein the drive train is attached to the first device and is moveably attached to a second device and wherein a restraining member is attached to the second device and prevents movement of the first device from the first position in the first direction;

applying a second force to the drive train until the first device moves in a second direction to a second position;

measuring a first-device-movement-distance using a first motion transducer, wherein the first-device-movementdistance is the distance between the first position and the second position;

measuring a drive-train-movement-distance using a second motion transducer, wherein the drive-train-movement-distance is the distance measured relative to the first device that a drive-train-representative-point moves between the first position and the second position; and computing the backlash from the first-device-movement-distance and the drive-train-movement-distance.

2. The method as recited in claim 1, where in the step of computing the backlash comprises:

computing a conversion factor, wherein the conversion factor is the ratio of the distance that the first device would move in response to a unit length movement of the drive-train-representative-point in the absence of any backlash;

multiplying the drive-train-movement-distance by the conversion factor to obtain a converted-drive-train-movement-distance; and subtracting the converted-drive-train-movement-distance from the first-device-movement-distance.

3. The method as recited in claim 1, wherein the step of measuring the first-device-movement-distance comprises:

measuring a first numeric value identified with the first position;

measuring a second numeric value identified with the second position; and subtracting the first numeric value from the second numeric value.

4. The method as recited in claim 3, wherein the steps of measuring first and second numeric values further comprises measuring illumination from a triangular target.

5. The method as recited in claim 1, wherein the step of measuring the drive-train-movement-distance comprises: counting reflective strips on a rotary gear.

6. The method as recited in claim 3, wherein the steps of measuring first and second numeric values further comprises measuring illumination from the first target using a linear image sensor.

7. An apparatus for measuring backlash in a drive train, comprising:

a first device, wherein the drive train is attached to the first device;

a second device, wherein the drive train is moveably attached to the second device;

a restraining member, wherein the restraining member is attached to the second device and prevents movement of the first device from a first position in a first direction;

a first motion transducer, wherein the first motion transducer is capable of measuring distance between the first position and a second position of the first device; and a second motion transducer, wherein the second motion transducer is capable of measuring distance that a drive-train-representative-point moves on the drive train when the first device moves from the first position to the second position.

8. The apparatus as recited in claim 7, wherein the first motion transducer comprises a first target and a first optical detector.

9. The apparatus as recited in claim 7, wherein the second motion transducer comprises a second target and a second optical detector.

10. The apparatus as recited in claim 7, wherein the first target comprises a reflective triangular target.

11. The apparatus as recited in claim 7, wherein the second target comprises a set of reflective strips on a rotary gear.

12. The apparatus as recited in claim 7, wherein the first optical detector comprises a linear image sensor.

* * * * *